United States Patent Office

3,814,577
Patented June 4, 1974

3,814,577
METHOD FOR PRODUCING GRAPHITIZABLE
SUBSTRATES FROM ACRYLIC FIBERS
Virginia C. Menikheim, Chapel Hill, N.C., assignor to
Monsanto Company, St. Louis, Mo.
No Drawing. Filed July 27, 1972, Ser. No. 275,846
Int. Cl. C01b 31/07; D06c 7/04
U.S. Cl. 8—115.5                                   5 Claims

ABSTRACT OF THE DISCLOSURE

A process is provided for producing a heat-stabilized char or substrate from acrylic fibers which can be converted into high quality carbon or graphite fibers. The process involves first treating the fibers in a diethanolamine or triethanolamine solution followed by an oxidation at elevated temperatures in an oxygen containing atmosphere. The pre-oxidation treatment drastically reduces the time required to effect the necessary oxidation, and the heat-stabilized substrate obtained yields carbon and/or graphite fibers of improved quality.

BACKGROUND OF THE INVENTION

Field of the invention

It is well-known that carbon and graphite fibers are eminently suited for use as reinforcing elements for structural materials because of their extraordinary tensile and modulus properties. Because of their enormous strength on a unit weight basis, these fibers offer particular advantage in the reinforcement of structural components used in modern high-performance aircraft. In view of this great potential, efforts are constantly being made for improvement and particularly in the raw materials and methods used in graphite fiber production.

This invention is directed to improvements in the method by which acrylic fibers are rendered graphitizable. As is known, carbon and/or graphite fibers are obtained from precursor fibers of organic origin. In making the conversion to carbon fibers, the organic precursors must be heated to temperatures in the range of from 1000° C. to 1600° C., while in the case of graphite fiber production, temperatures as high as 2500° C. to 2900° C. are employed. It is readily apparent that organic materials cannot withstand such temperatures in the absence of a pre-stabilization against thermal degradation. The present invention provides a more convenient and effective means for heat-stabilizing acrylic fibers to the level required for conversion to graphite fibers.

In the past, acrylic fibers have been converted to a graphitizable substrate via a direct oxidation without previous treatment. That is, untreated fibers were heated in the presence of an oxygen containing atmosphere until sufficient oxidation had been attained. The temperature was maintained at 240° C. or below for a substantial time during the procedure because unmodified acrylic fibers cannot withstand higher temperatures in a gaseous medium. As a result, at least 7 hours and often as much as 24 hours was required to obtain a sufficient degree of oxidation. Furthermore, the process was not readily controllable to yield a substrate of the preferred internal structure for obtaining carbon or graphite fibers of optimum tensile and modulus properties.

SUMMARY OF THE INVENTION

Accordingly, it is an object of this invention to provide a more economical method for the production of heat stable, carbonizable and graphitizable substrates from acrylic precursor fibers.

Another object of the invention is to provide a method which greatly reduces the time required for achieving heat stabilization of fibers derived from acrylic polymers.

An additional object is the provision of a method for the production of a heat stable, carbonizable and graphitizable substrate from an acrylic fiber precursor, which substrate has a preferred structure for subsequent conversion to a very high strength and high modulus carbon or graphite yarn.

The method of the invention broadly considered comprises a first preoxidation step wherein the acrylic fibers are treated by immersion in a heated bath containing a polyalkanolamine selected from the group consisting of diethanolamine and triethanolamine. The pre-treated fibers are then oxidized by exposure to an oxygen containing atmosphere at a temperature of from 270° C. to 350° C. while under tension.

DESCRIPTION OF THE INVENTION

In the context of this invention the term "acrylic polymer" refers to copolymers and terpolymers of polyacrylonitrile as well as the homopolymer. That is, those polymers are included which are obtained by polymerizing acrylonitrile with monomers such as vinyl acetate, methyl acrylate and others which are known by those skilled in the art to be polymerizable with acrylonitrile to give satisfactory fibers. The processes used in the production of such polymers, and their conversion into fibers are well known by those skilled in the art. In the case of copolymers and terpolymers, it is generally desirable that they contain at least 85 percent by weight of polyacrylonitrile.

Although the term "fiber" is predominately used herein, the terms "yarn" and "tow" should be considered interchangeable therewith. That is, fiber in the form of yarn or tow or a single filament are equally applicable in the method hereinafter described.

The process is carried out in two distinct stages or steps which for convenience may be designated the pre-oxidation and the oxidation steps. As a consequence of the first or pre-oxidation treatment, the oxidation phase can be carried out much more rapidly than would otherwise be possible since among other reasons temperatures in excess of 270° C. can be employed without thermal damage to the fiber.

In conducting the pre-oxidation treatment, the fibers are fully immersed in the polyalkanolamine bath maintained at a temperature in the range of from about 165° C. to 210° C. with from about 185° C. to 200° C. being generally preferred. The dwell time in the bath is from about 1 to 15 minutes, with from about 1 to 5 minutes being usually of preference.

Although the application of tension to the fiber during the course of treatment in the bath is not a critical requirement, it may be used to advantage in that it tends to favor the modulus property of the ultimate graphite fiber. When employing tension, at least enough is required to prevent the occurrence of shrinking. It has been found that a tension of 50 to 60 grams is generally sufficient to maintain constant length when employing yarns in the 1800 to 2000 denier range.

During the course of treatment the polyalkanolamine reacts with the polymer of the fiber to provide initiation sites for subsequent polymerization of the nitrile groups. This subsequent polymerization then forms a thermally resistant "ladder" polymer.

It is suggested that the mechanism by which the initiation sites are introduced into the polymer may be based in part upon the slightly ionic character of the polyalkanolamine treating agents. For example, triethanolamine ionizes at 185° C. to 200° C. probably to a limited extent as follows:

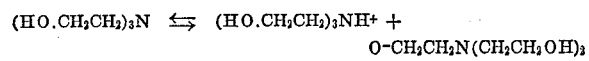

The cation, as shown above, catalyzes addition of the anion to a few of the nitrile groups of the polymer to form imine esters in accordance with the following equation wherein the ions are represented as A+ and B—:

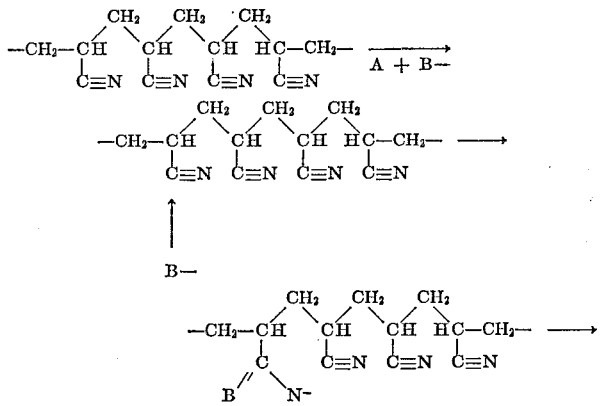

The presence of the anionic sites can initiate nitrile polymerization instantly or at a later stage. However, it is important that the extent of polymerization be limited until the subsequent oxidation step. This is accomplished by using the mildest conditions possible during the bath treatment consistent with establishing sufficient polymerization sites. The reason for this is that premature polymerization restricts the mobility of the polymer molecule so as to impair the degree of orientation realizable by stretching the fiber during oxidation.

When untreated acrylic fibers are subjected to differential thermal analysis (DTA), the scans show a large exotherm starting between about 200° C. to 230° C. and peaking at about 260° C. to 340° C. The precise temperature at which the exotherm starts and peaks is dependent upon the particular polymer composition. Since this exotherm is believed to be associated with nitrile polymerization, it provides a means for monitoring the adequacy of polymer modification and a guide for any necessary adjustment in pre-oxidation treating conditions.

The temperature at which the triggered exotherm attains its peak ($\Delta T$) is believed to be influenced by the ability of the nitrile groups to react. Polymerization initiators shift the position of the exotherm peak to a lower temperature. Changes in the actual height of the peak, as opposed to the temperature of its occurrence, are believed to be related to the number of nitrile groups able to react or in the ability of the nitrile groups to react rapidly.

Acrylic fibers, which are adequately modified in their polymer structure by the pre-oxidation treatment, give DTA scans with the exotherm peak positions occurring at temperatures from about 15° C. to 60° C. below that of the untreated fiber control.

The actual height of the peak ($\Delta T$) for properly treated fibers should not be appreciably lower than that of the untreated fiber. Substantially lower peak heights indicate premature cyclization and polymerization resulting from pre-oxidation conditions that are too severe or overly prolonged.

After the fibers have been adequately treated in the polyalkanolamine bath, they are water washed before proceeding to the oxidation step of the process. That is, all unbound treating agent must be removed to avoid stiffness in the fiber following the oxidation procedure. If the treated fiber is to be stored for a period of time before further processing, it is advisable that it be dried after washing. When operating continuously, a drying step may be used to advantage, but it is not an essential requirement.

In carrying out the second phase or oxidation step of the process, the pre-treated acrylic yarns are heated under tension in air or other oxygen containing atmosphere to a temperature in the range of from about 270° C. to 350° C. The residence time will generally be from about 45 minutes to 3 hours depending upon the temperatures employed and the degree of fiber modification achieved in the pre-treatment.

It is desirable that the fiber be brought to the 270° C. temperature level within 30 minutes and preferably in about 10 minutes. An exposure to intermediate temperatures for too long usually results in excessive reaction before the fiber attains the plastic state. When this occurs the fiber extensibility becomes impaired. Once the fiber has been exposed to the 270° C. level and stretched, the temperatures of the remaining oxidation period can be varied in the 270° C. to 350° C. range.

The application of longitudinal tension during oxidation will substantially increase the strength and modules of the eventual carbon or graphite fibers produced. As a minimum, sufficient tension should be employed to prevent shrinkage, with elongations up to 15 percent and beyond being preferred.

The process of this invention may be conducted either in a batchwise manner or continuously. The resulting product may be carbonized to produce carbon yarns by conventional procedures. Alternatively, the treated yarns can be converted directly to graphite yarns having extraordinary strength and modulus. Graphization can be acomplished by heating the thermally stable substrate to between 2500° C. and 2900° C. in an inert atmosphere while applying longitudinal tension.

Since the yarns processed in accordance with this invention are dimensionally stable at very high temperatures in addition to being fireproof, they may also be used in the fabrication of fireproof articles such as clothing, tenting and coverings of various types.

DESCRIPTION OF THE PREFERRED EMBODIMENTS

Example I

A sample of continuous filament yarn derived from an acrylonitrile-vinyl acetate copolymer (AN/VA-92/7) was immersed for a period of 4 minutes in a bath of triethanolamine maintained at 195° C. Following the bath treatment, the yarn was water washed and dried. Thereafter, a differential thermal analysis scan was taken on a sample of the treated fiber and the exotherm peaked at 275° C. which was 50° C. below that of a sample of untreated fiber used as a comparative control. This indicated that the treated polymeric fiber had been sufficiently modified by the incorporation of nitrile polymerization sites for carrying out an effective and expeditious air oxidation.

The treated yarn was then heated in air at 275° C. for 30 minutes and at 310° C. for 105 minutes. The resulting yarn was free of fusion and non-flammable in a Meker burner flame. It could be directly graphitized to produce high strength, high modulus graphite fiber.

Example II

An acrylic copolymer yarn containing 92 percent acrylonitrile and 7 percent vinyl acetate was immersed in a bath of diethanolamine heated to a temperature of 185° C. The yarn was exposed to the bath conditions for a period of 4 minutes after which is was washed in water and dried. Thereafter, a differential thermal analysis scan was taken on a sample of the treated fiber and the exotherm peaked at 284° C. This was 41° C. below the temperature at which the exotherm peaked for the untreated fiber.

The treated yarn could be air-oxidized in less than two hours at a temperature ranging between 275° C. and 310° C. The oxidized product when directly graphitized produces high quality graphite fiber.

I claim:

1. A process for producing a carbonizable and graphitizable substrae from acrylic fibers containing at least 85 percent by weight of polyacrylonitrile which comprises:

(1) introducing said fibers into a treating bath containing a polyalkanolamine treating agent selected from the group consisting of diethanolamine and triethanolamine and maintained at a temperature in the range of about 165° C. to 210° C.; permitting said fibers to remain in said treating bath for a period of from about 1 to 15 minutes, after which said fibers are water washed to remove all of said treating agent not chemically bound to said fibres and thereafter;

(2) heating said fibers under a tension at least sufficient to prevent shrinkage in an oxygen containing atmosphere at a temperature in the range of from about 270° C. to 350° C. for a period of from about 45 minutes to 3 hours.

2. The process in accordance with claim 1, wherein said polyalkanolamine is diethanolamine.

3. The process in accordance with claim 1, wherein said polyalkanolamine is triethanolamine.

4. The process in accordance with claim 1, wherein step (2) said fibers are brought to a temperature of 270° C. within 30 minutes.

5. The process in accordance with claim 1, wherein said fibers are maintained under a tension at least sufficient to maintain constant length while in said treating bath.

References Cited
UNITED STATES PATENTS 3,767,773  10/1973  Turner et al. _____ 8—115.5 X HERBERT B. GUYNN. Primary Examiner H. WOLMAN, Assistant Examiner U.S. Cl. X.R.

423—447